United States Patent [19]

Dietrich

[11] 4,028,903

[45] June 14, 1977

[54] METHOD AND APPARATUS FOR MANEUVERING PIPE ENDS IN A SUBSEA LOCATION

[75] Inventor: Dave S. Dietrich, Magnolia, Tex.

[73] Assignee: HydroTech International, Inc., Houston, Tex.

[22] Filed: Nov. 12, 1975

[21] Appl. No.: 631,101

[52] U.S. Cl. .............................. 61/110; 29/281.5; 214/1 PA; 214/152

[51] Int. Cl.² .......................................... B23P 19/04

[58] Field of Search ............... 214/1 PA, 152; 29/200 P, 281.1, 281.5, 237; 61/72.3, 110, 111; 228/49

[56] References Cited

UNITED STATES PATENTS

| | | | |
|---|---|---|---|
| 3,204,417 | 9/1965 | Robley | 214/1 PA |
| 3,529,731 | 9/1970 | Penny | 214/1 PA |
| 3,658,231 | 4/1972 | Gilman | 29/200 P |

Primary Examiner—Robert J. Spar
Assistant Examiner—George F. Abraham

[57] ABSTRACT

A method and apparatus for laterally maneuvering the ends of pipes supported on the seabed under a body of water. The method includes mounting a first support frame adjacent to one of the pipe ends and supporting the first frame on the seabottom. A connecting means is secured between the pipe and the first support frame and thereafter the adjacent pipe is raised by applying a lifting force to the connecting means. A second separate support frame is mounted adjacent to the other of said pipes and with the second frame being supported on the seabottom. Another connecting means is secured between the other pipe and the second support member and the other pipe is raised by applying a lifting force to the other connecting means. Thereafter, with both pipe ends thus supported in cantilevered fashion, the pipe ends are moved laterally and vertically relative to the support frame until the pipe ends are brought into positions where the axes thereof generally intersect.

10 Claims, 5 Drawing Figures

METHOD AND APPARATUS FOR MANEUVERING PIPE ENDS IN A SUBSEA LOCATION

BACKGROUND OF THE INVENTION a. Field of the Invention

This invention relates to apparatus and methods for maneuvering the ends of pipes, such as an underwater pipeline or portions thereof in such fashion that the ends thereof may be brought into axial alignment or at least the axes thereof brought in intersecting alignment so as to facilitate subsequent interconnecting of the two pipes.

b. Description of the Prior Art

Heretofore, it has been customary practice to manipulate the ends of two underwater pipe sections into perfect axial alignment by mounting a single frame extending over both pipe ends. However, this method required a single large frame of massive construction and size, capable of physically and simultaneously grasping and forcing the pipes ends into perfect axial alignment after which the pipe ends are interconnected by conventional coupling means. However, the aforesaid method required a huge frame or the like which is difficult to maneuver and quite expensive to build and operate.

SUMMARY OF THE INVENTION

It is, therefore, an object of this invention to provide an improved method and apparatus utilizing at least one frame for maneuvering into generally axial alignment the ends of two axially spaced apart pipes supported on the seabed under a body of water.

Briefly stated, one method of this invention contemplates mounting a first support frame adjacent to one of the pipes and supporting the first frame on the seabottom. A connecting means is then secured between the pipe and a support frame, after which the pipe is raised by applying a lifting force to the connecting means. A separate second support frame is mounted adjacent to the outer pipe and supported on the seabottom, as with the first frame. Another connecting means is secured between the other pipe and the second support member or frame. The other pipe is then raised by applying a lifting force to the other connecting means. Thereafter, the pipe ends are moved laterally and vertically relative to each other while the pipes are supported by the frames, which movement is continued until the axes of said pipes generally intersect.

Preferably, each of the pipes has the connecting means attached thereto at points axially spaced a substantial distance away from the terminal ends thereof to thereby support each of the pipe ends in cantilevered fashion above the sea bottom. The connection of the pipes to the frame may be performed by passing a flexible member around the bottom side of each of the pipes and after which each of the pipes is raised by applying the lifting force to the flexible member associated therewith.

The method may also include providing apparatus for mounting coupling members on the raised ends, and lowering the mounting apparatus from the surface to the raised pipe ends between the first and second support frame, to mount coupling members thereon as aforesaid. In its broadest sense, the method includes the steps of supporting at least one frame on the sea bottom near the end of one of the pipes, securing connecting means between the one pipe end and the frame, raising the one pipe end by lifting said connecting means, and moving the connecting means and the one pipe end horizontally and vertically relative to the other pipe end to thereby position the pipe ends in general axial alignment.

The apparatus of this invention is for a modular, self-contained, portable manipulation frame for enabling a diver to manipulate a pipe located on a sea botttom. The apparatus comprises a pair of spaced legs disposable on opposite sides of the pipe, the legs having massive footings for providing stability to the frame. A cross-member is supported between the spaced legs. In addition, means for connecting the pipe to the cross-member is provided, as are means for moving the connecting means vertically and horizontally to effect vertical and horizontal movement of the pipe end. The vertical and horizontal moving means include a pressurized hydraulic power source and controls disposable at seabottom, whereby a diver, by operating the controls, can selectively move the connecting means to manipulate the pipe vertically and horizontally as aforesaid. The means for effecting vertical movement may include a pair of hydraulically actuated piston and cylinder assemblies attached at opposite ends thereof to the cross-member and legs, respectively. Preferably, the hydraulic power source is fixed to the frame and portable therewith. Further, the footings are generally elongated in a direction transverse to the cross-member to provide increased stability. The piston and cylinder assemblies are pivotally attached to the cross-member to permit pivotal movement therebetween.

DESCRIPTION OF THE PREFERRED EMBODIMENT

Figure 1:
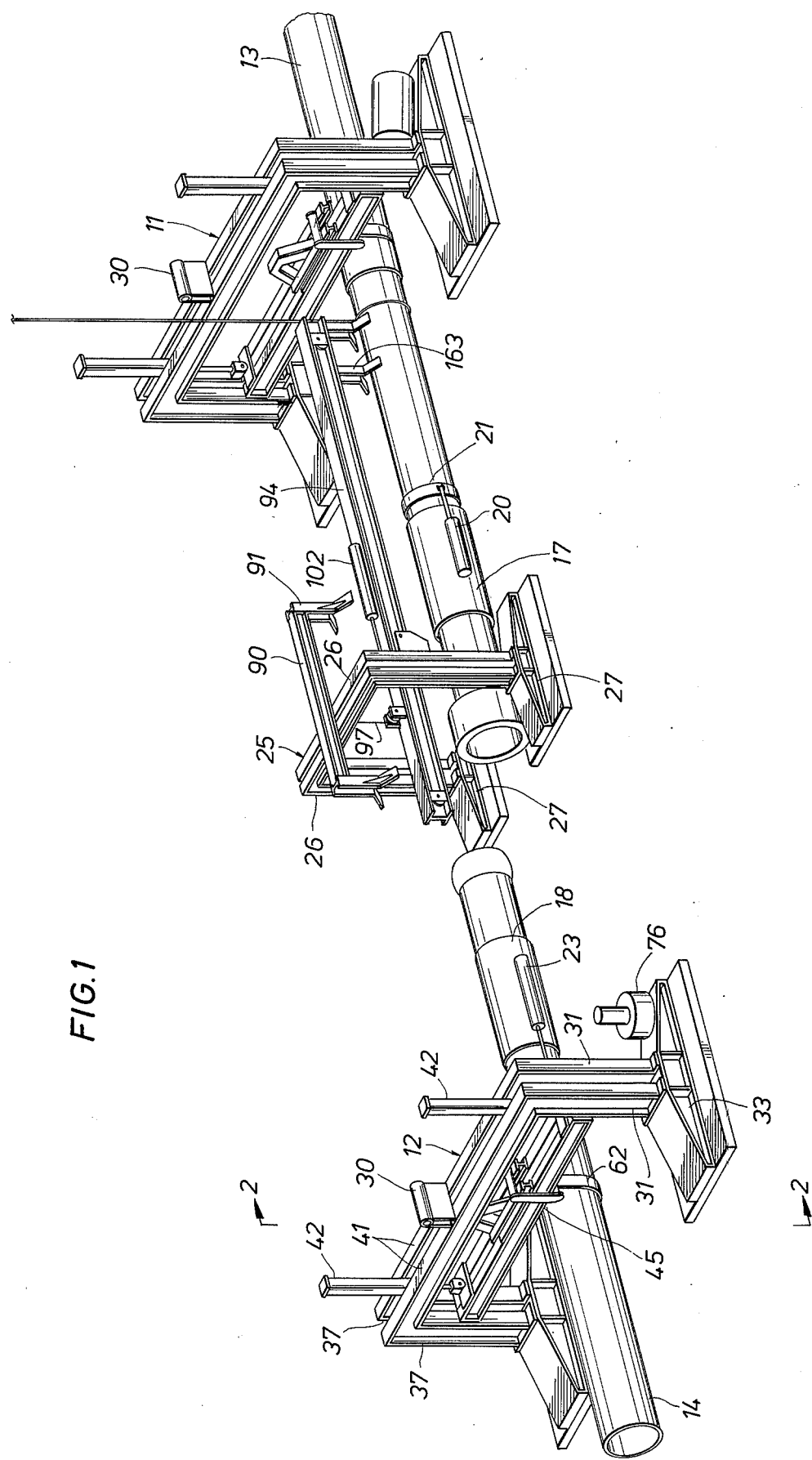
FIG. 1 is a schematic view showing apparatus for supporting the pipe ends and apparatus for mounting a coupling member over one of the pipe ends in a subsea environment.

Referring now to the drawings, the numerals 11 and 12 are used to generally designate substantially identical pipe lifting and alignment frames which are shown respecively supporting off the seabed pipes 13 and 14. It is to be understood that pipes 13 and 14 may be two separate pipes which are to be joined to complete a pipeline or may be an original pipeline which has been severed so that a repair part or portion may be inserted. In any event, the terminal ends of pipes 13 and 14 are axially spaced apart and are to be interconnected for fluid flow purposes or the like.

The end of pipe 13 is suspended in cantilevered fashion by alignment frame 11 and has particlly mounted thereover female ball coupling member 17. Similarly, the end of pipe 14 is supported in cantilevered fashion by frame 12 and has mounted thereover male ball coupling member 18. It is to be understood that coupling members 17 and 18 are of the hydraulically actuated type which are arranged for interconnection for fluid flow therethrough and which are also hydraulically actuated to grip and seal the respective pipes over which the same are mounted. Couplings of the aforesaid type are generally taught in U.S. Pat. No. 3,874,706.

Coupling member 17 is provided with and has attached thereto a pair of hydraulic rams 20, each of which is spaced on opposite sides thereof and both of which are connected to a hydraulically opened and closed pipeclamp 21, the latter being arranged for clamping about pipe 13 and subsequently releasing as desired. Hence, by manipulation of arms 20 and clamp 21, coupling member 17 may be moved axially on pipe 13 once coupling member 17 is placed thereover. Similarly, coupling member 18 has a pair of rams 23 which are similarly connected to a hydraulically actuated clamp (not shown) for engaging pipe 14 so that coupling member 18 may be similarly moved axially on pipe 14, once coupling member 18 is mounted thereover.

Apparatus for mounting coupling member 17 and 18 over the respective pipes are generally designated by the numeral 25 and include an inverted U-shaped frame 26, each leg of which is attached to a footing 27 for support on the seabed, as will be explained hereinafter.

Figure 2:
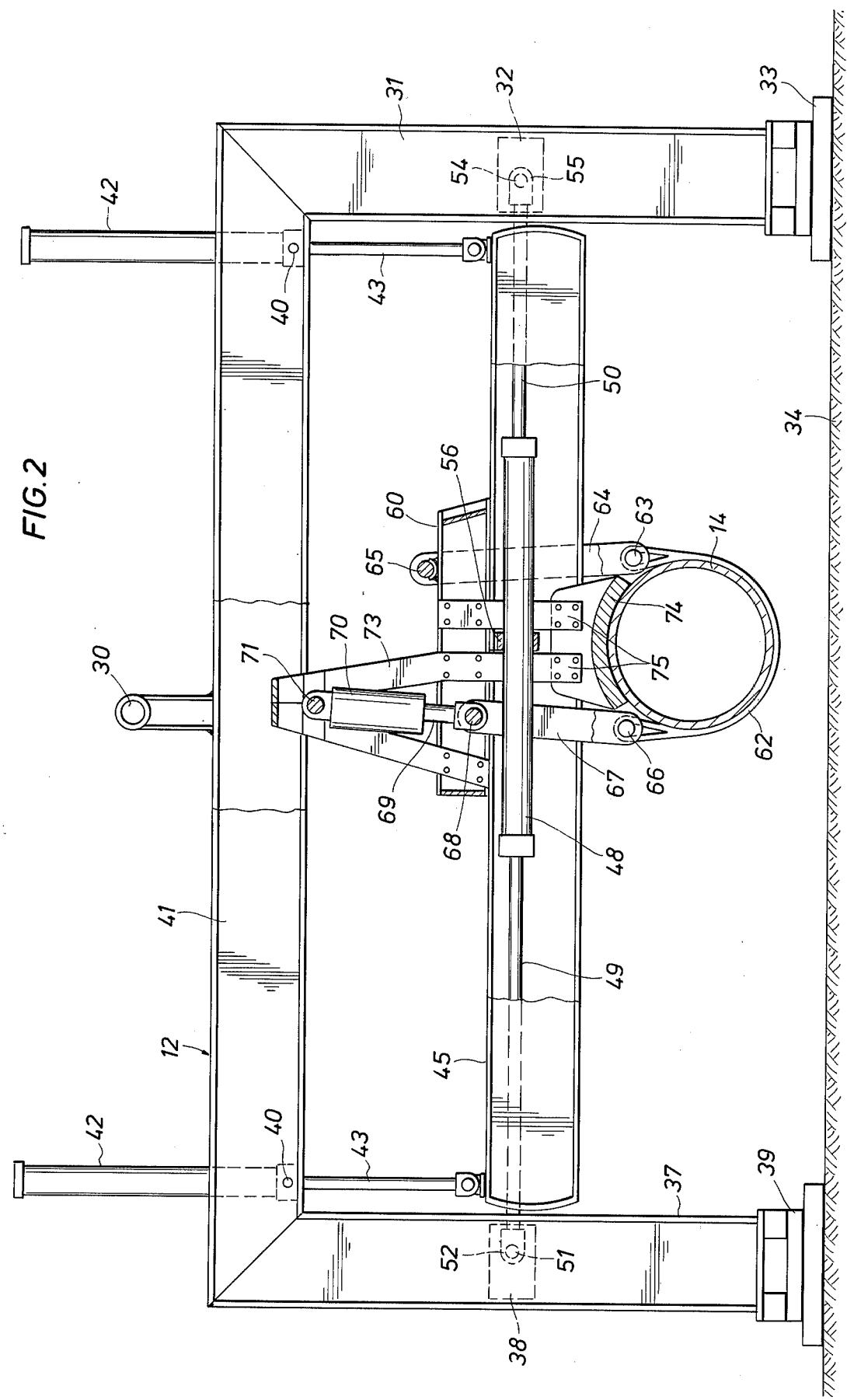
FIG. 2 is a an elevation view of the pipe support frames taken generally along line 2—2 of FIG. 1.

In order to make a connection between pipes 13 and 14, it is usually necessary to bring the same into sufficient alignment such that the axes thereof intersect. To accomplish this purpose, alignment frames 11 and 12 are lowered to the positions shown by means of cable (not shown) attached to pickups 30 with the other end of the cable being manipulated from above. Referring in particular to FIGS. 1 and 2, the details of construction and operation of frame 12 will be described. It is to be understood, however, that frame 11 is substantially identical thereto and, hence, no separate detailed description will be given of alignment frame 11. Frame 12 as shown in FIG. 2 is formed with a pair of vertically extending spaced I-beams 31, which together form a vertically extending runway therebetween and in which is mounted guide block 32 for vertical movement therein. The lower end of beams 31 are attached to an appropriately sized footing 33, usually of massive proportions, for support and stability on seabottom 34. The left side of frame 12 has another pair of vertically extending I-beams 37 which form therebetween the vertical runway in which is mounted another guide block 38 for vertical movement therein. The lower end of beams 37 are connected to another footing 39 identical to footing 38 and may have incorporated therein a tool box or the like.

The top ends of beams 31 and 37 are joined by a pair of cross I-beams 41 which are similarly spaced a small distance apart for support of certain working apparatus therebetween. Beams 41 have pivotally mounted therebetween, near the ends thereof as at 40, a pair of hydraulic ram cylinders 42 which extend upwardly from beams 41 and each of which has downwardly extending piston rods 43 which are pivotally connected at the lower ends thereof to transverse beams 45. Hence, by application of hydraulic fluid pressure to opposite ends of ram cylinders 42, beams 45 may be raised and lowered thereby. Beams 45 have mounted therebetween hydraulic cylinder 48 in which is mounted a piston (not shown), one side of which is attached to rod 49 and the other side of which is connected to rod 50. The other end of rod 49 is connected to a pin 51 which is mounted for limited lateral travel in slot 52 in block 38. Similarly, the other end of rod 50 is attached to pin 54, which is arranged for limited lateral travel in slot 55 provided in block 32. The limited lateral travel of pins 51 and 54 permits runway beams 45 to be tilted relative to beams 41.

Cylinder 48 has attached thereto at 56 laterally movable carriage means in the form of skid 60 which is supported by the upper surfaces of beams 45. Hence, cylinder 48 and skid 60 which is supported by the upper surfaces of beams 43. Hence, cylinder 48 and skid 60 may be moved laterally in either direction depending upon the application of hydraulic fluid to the appropriate end of cylinder 48.

Means for connecting pipe 14 to skid 60 conveniently take the form of a flexible strap 62 which is passed beneath pipe 14 prior to the initial lifting operation and is connected at one end by pin 63 to a pair of adjustable links 64, the opposite ends of which are connected to the top portion of skid 60 by pin 65. The other end of strap 62 is connected to pin 66, which in turn is connected to a pair of links 67 which in turn are connected by pin 68 to the lower end of piston rod 69 which is arranged for operation by hydraulic piston (not shown) in ram cylinder 70. The upper end of cylinder 70 is pivotally connected by pin 71 to the upper end of A-frame 73, the lower end of which is bolted or otherwise attached to and supported by skid 60.

Once strap 62 is secured at both ends, then the pipe 14 is raised relative to runway beams 45 by application of hydraulic fluid to ram cylinder 70 to cause piston rod 69 to retract until the top portion of pipe 17 contacts saddle 74, which is attached to skid 60 by straps 75. With the pipe 14 thus held, it may be raised additionally by operation of rams 42.

In operation of frame 12, it is initially lowered from a support vessel by having a cable attached to pickup 30 and thereafter further lowered to the subsea position straddling pipe 14. Thereafter, by application of hydraulic fluid to cylinders 42, runway beams 45 are lowered such that strap 62 can readily be passed underneath pipe 14 with the ends thereof connected as shown in FIG. 2. Thereafter, by applying hydraulic fluid to cylinders 42 to cause piston rods 43 to retract, runway beams 45 can be raised and, hence, pipe 14 therewith. By applying hydraulic fluid to cylinder 48 it can move laterally relative to rods 49 and 50 to effect lateral movement of skid 60 and pipe 14 relative to beam 45. Preferably, a hydraulic fluid power source 76 is fixed to frame 12 to provide the hydraulic fluid to the cylinders via conduits and controls (not shown).

Accordingly, by a diver operating frames 11 and 12 in the manner just described with respect to frame 12, pipes 13 and 14 can be lifted and moved laterally as well as being raised and lowered until the axes thereof are intersecting.

In order to facilitate the passage of coupling members thereover, it may be desirable to misalign the two pipes sufficiently to permit the overshooting of the coupling members prior to the movement of the pipes to the position of having the axes thereof intersect.

Figure 3:
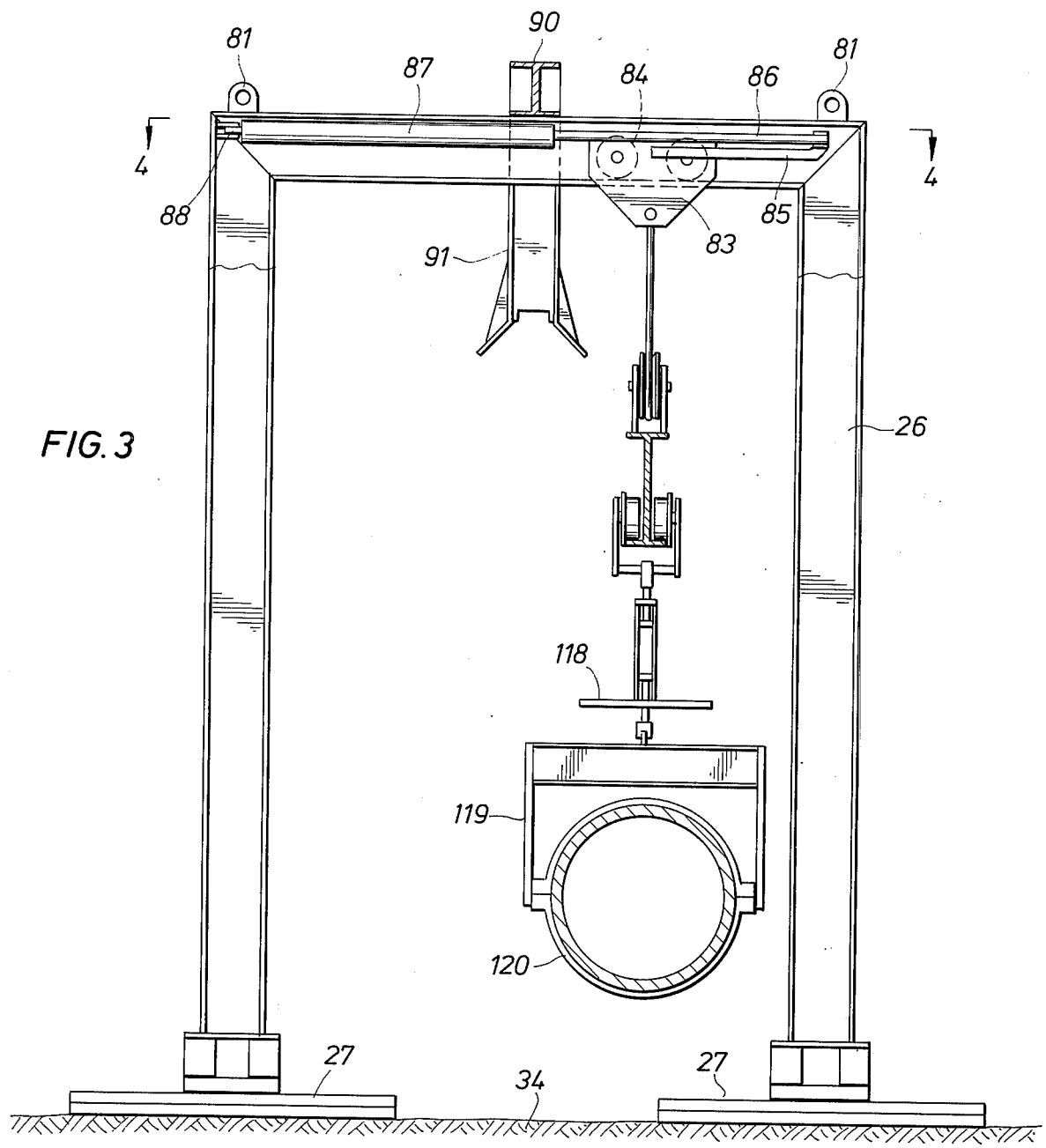
FIG. 3 is an elevation view of a portion of the apparatus for mounting the pipe coupling over the end of the pipe as shown in FIG. 1.
Figure 4:
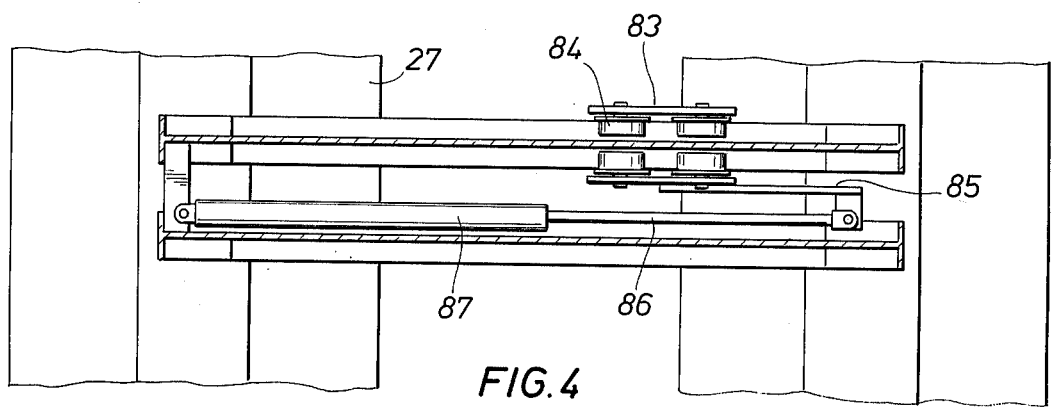
FIG. 4 is a top plan view, partially in section, taken generally along line 4—4 in FIG. 3.

Referring more particularly now to FIGS. 1, 3—5, apparatus and method for mounting a coupling member over the end of one of the aforesaid pipes will now be described. More particularly, the aforesaid coupling mounting apparatus identified by the numeral 25 will be described. This apparatus includes the double I-beam inverted U-shaped frame 26 previously identified, the lower ends of which even have large area footings 27 attached therewith for support on seabottom 34. The top end of frame 26 has a pair of lifting eyes 81 attached therewith for manipulating and handling. In addition, the upper end of frame 26 supports a transversely moving trolley 83 which has a plurality of wheels 84 arranged to run on the bottom flange portion of the upper frame end, as shown in FIGS. 3 and 4. Trolley 83 has attached thereto connecting arm 85 which extends generally horizontally, with the other end thereof being attached to piston rod 86, which in turn is connected to a piston (not shown) mounted in hydraulic cylinder 87, the other end of which is attached to the frame as by pin 88. Hence, upon application of hydraulic fluid pressure to an appropriate end of cylinder 87, piston rod 86 can be either extended or retracted to thereby selectively move trolley 83 laterally along the top end of frame 26.

Frame 26 also has rigidly attached therewith a generally transversely extending rest beam 90, each end of which has attached thereto and depending therefrom generally inverted Y-shaped guide arms 91, the purpose of which will be explained hereinafter. Rest beam 90 may also have conveniently attached therewith a pair of lifting eyes 92 for engagement with a cable to facilitate raising and lowering thereof in the body of water.

Coupling mounting apparatus 25 also includes support means in the form of main support beam 94, which is generally of I configuration of cross-section, one end of which has attached therewith guide tube 95 which is shown having passing therethrough guideline 96 which is looped around pipe 13 and extends upwardly therefrom to the surface. The other end of support beam 94 is connected to frame 26 by means of cable 97, one end of which is attached to trolley 83 and which is trained over pulley 98 rotationally mounted between lug 99 rigidly attached to the upper side of beam 94. Cable 97 in turn is connected to piston rod 101 which in turn is connected to a piston (not shown) mounted in hydraulic cylinder 102, the opposite end of which is connected to lugs 103 by pin 104. Hence, upon application of hydraulic fluid to an appropriate end of cylinder 102, piston rod 101 can be either extended or retracted to thereby selectively lower or raise support beam 94 relative to trolley 83 and beam 90.

The opposite end of support beam 94 has attached therewith and depending downwardly therefrom a pair of axially spaced apart inverted Y-shaped alignment arms 103, which when both are maneuvered into proper position with pipe 13—i.e. the crotch of both Y-shaped arms 103 being in firm contact with pipe 13, align support beam 94 with pipe 13 and space the same a predetermined parallel distance therefrom; such maneuvering of beam 94 being effected by a diver operating hydraulic cylinders 102 and 87.

Support beam 94 has mounted thereon a cariage means in the form of trolley 105 which is supported on the lower flanges thereof by a plurality of wheels 106, such that trolley 105 may freely move longitudinally thereon.

Figure 5:
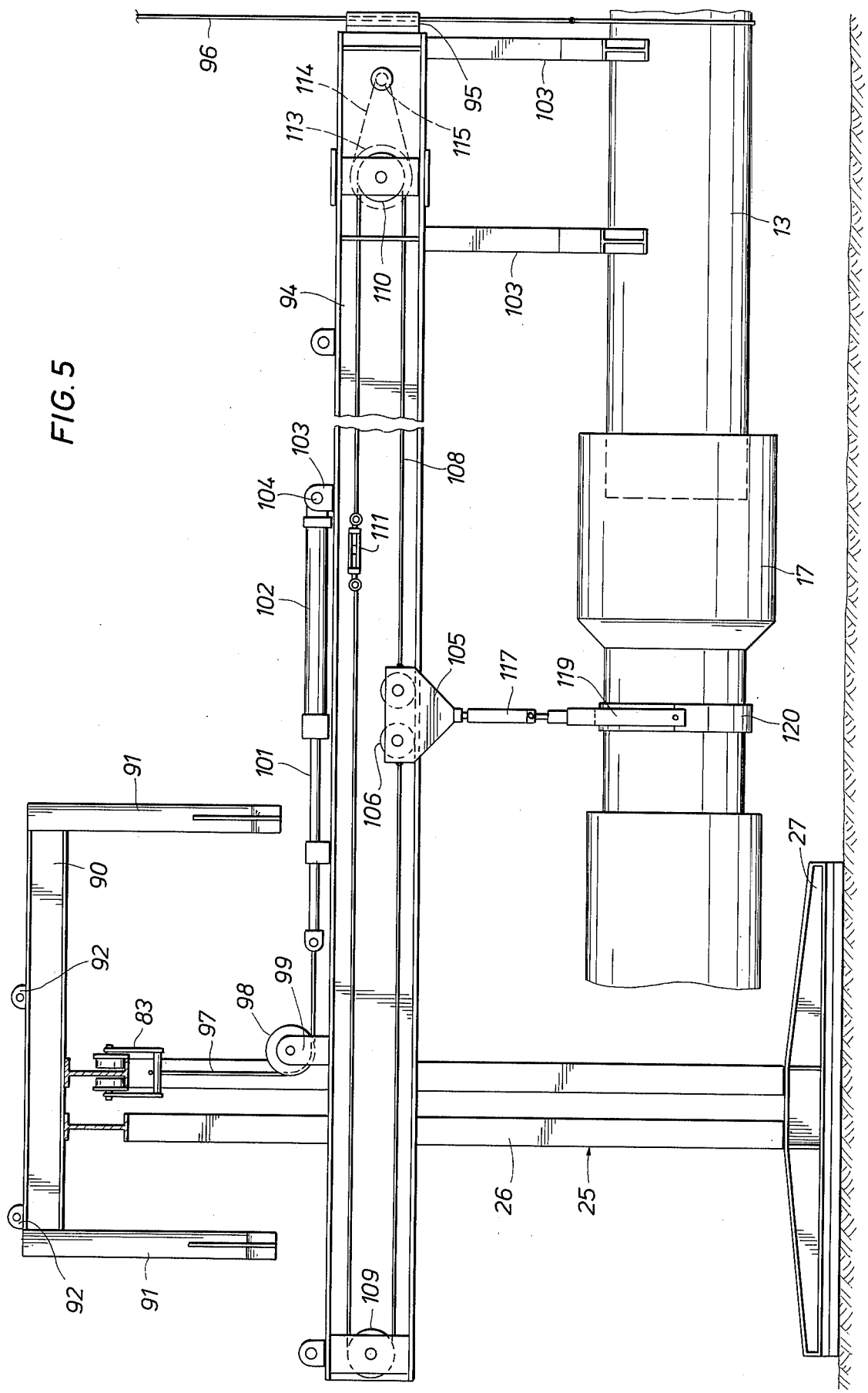
FIG. 5 is a side elevation view of the apparatus shown in FIG. 3, which is utilized for mounting the coupling member over the end of a pipe.

Power means are provided for moving trolley 105 longitudinally on support beam 84, and these means take the form of a cable 108 attached on each end of trolley 105 and trained over pulley 109 mounted in the left end of beam 94, as seen in FIG. 5, and over pulley 110 mounted in the right end of beam 94, and having intermediately thereof spring loaded turn buckle 111 to maintain a constant predetermined tension on cable 108. It is to be understood that pulley 110 is a driven pulley, being driven through sprocket gear 113 by drive chain 114 trained over pinion drive gear 115 which is arranged to be driven by an appropriate reversible air air or hydraulic motor or the like (not shown). Hence, by operation of drive gear 115, trolley 104 may be moved longitudinally on support beam 94. Trolley 105 is arranged to support coupling member 17 through turn buckel 117, the lower end of which has transversely extending handling bar 118 and also has connected therewith coupling cradle 119, which in turn is provided with clamp 120, which is arranged for clamping about the center of gravity of coupling member 17. With clamp 120 mounted on coupling member 17 at the center of gravity, coupling member 17 can be supported by a single connection, as shown, and easily manipulated thereby.

Preparatory to operation of coupling mounting apparatus 25, alignment frames 11 and 12 would initially be installed and have been operated to raise pipes 13 and 14 to the cantilevered support position generally shown in FIG. 1. In the event that the axial spacing between pipes 13 and 14 was not sufficient to permit the oversliding of coupling members 17 and 18 thereover, then the pipes 13 and 14 would be moved laterally a sufficient distance to permit such overshooting as will be described hereinafter, after which the pipes 13 and 14 can be brought back into generally axial alignment, at least with the central axes thereof intersecting, to accomplish the final interconnection of coupling members 17 and 18.

With pipes 13 and 14 supported as aforesaid, guideline 96 is lowered from the sea surface and looped about pipe 13 in the manner shown in FIGS. 1 and 5. Above the surface of the water, coupling member 17 is engaged by clamp 120 at the center of gravity and turn buckle 117 is adjusted to space the top of coupling member 17 the correct distance below support beam 94 such that when support beam 94 is brought into substantial parallel alignment with the axis of pipe 13, coupling member 17 will be supported substantially coaxially therewith. Hence, operation of turnbuckle 17 permits the use of this apparatus for pipe couplings of various diameter.

Additionally, hydraulic fluid is applied to cylinder 102 such as to cause rod 101 to be withdrawn thereinto until support beam 94 is engaged with the lower ends of guide arms 91 and held securely in contact therewith. Thus held, support beam 94 is prevented from rotation away from the transverse alignment with frame 26.

Thus assembled, coupling mounting apparatus 25, having coupling member 17 supported therebelow, is lowered from the sea surface and guided by guideline 96 until footings 27 of frame 26 come to rest on seabottom 34. Thereafter, cable 97 is paid out by operation of cylinder 102 until both alignment arms 103 contact with pipe 13. In certain instances, it may be necessary to move the opposite end of support beam 94 transversely by operation of hydraulic cylinder 87 and trolley 83 to bring alignment arms 103 in alignment with pipe 13, such that support beam 94 is generally parallel with the central axis of pipe 13. Thus aligned, coupling member 17 will be substantially coaxially positioned with respect to the end of pipe 13. Thereafter, trolley 105 may be caused to move forwardly toward pipe 13 in the manner described above, such that coupling 17 is slid over the end of pipe 13 in the manner shown in FIG. 1. Minor adjustments in the relative position of coupling member 17 may be required to keep the same in coaxial alignment during the movement of the same over pipe 13 and this is accomplished by raising and/or lowering coupling 17 as described above or by moving the same laterally as described above.

Once coupling member 17 is mounted over pipe 13 a sufficient distance to support the same, clamp 120 may be removed from coupling member 17 and the coupling member 17 moved along on pipe 13 by operation of rams 20 and clamp 21, as previously described.

In certain instances, in order to reduce wave action on coupling member 17 during the installation phase, a removable line (not shown) may be tied between the end of coupling member 17 and support beam 94 to prevent ocean currents and the like from twisting or turning coupling member 17 relative to support beam 94. By having coupling member 17 supported at a single center of gravity point, as described above, only three controls are required to mount coupling member 17 over pipe 13, they being the controls which operate the cylinders 87 and 102 and the motor which drives cable 108. Hence, the diver has a mininum of controls to operate to successfully stab coupling member 17 over pipe 13. Once the overstabbing operation has been completed, then coupling mounting apparatus 25 may be removed and the operation repeated on the other coupling as, for example, coupling member 18 which is shown already mounted over pipe 14 in FIG. 1.

After both coupling members 17 and 18 are mounted over the respective pipe ends, as shown in FIG. 1, and the alignment apparatus 25 removed, then the center axis of pipes 13 and 14 are brought into intersecting relationship, if the same do not exist already in that relationship, by operation of frames 11 and 12. Thus positioned, coupling members 17 and 18 are thereafter interconnected as is well known to those skilled in the art and are actuated to sealing and gripping engagement with the respective pipes, thereby completing the interconnection of pipes 13 and 14, after which alignment frames 11 and 12 may be disengaged and removed from the seabottom, and with the pipes 13 and 14 once again resting upon the seabottom.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a method of maneuvering onto general axial alignment the ends of two axially spaced apart pipes supported on the seabottom under a body of water, the combination of steps comprising;

mounting a first support frame adjacent to one of said pipe and supporting said first frame on said seabottom;

securing connecting means between said one pipe and said first support frame;

raising said one pipe by applying a lifting force to said connecting means;

mounting a separate second support frame adjacent to the other of said pipes and supporting said second frame on said seabottom, said second support frame being independent of and axially spaced apart from said first frame;

securing another connecting means between said other pipe and said second support member;

raising said other pipe by applying a lifting force to said other connecting means;

and moving said pipe ends laterally and vertically relative to each other while said pipes are supported by said frames, to thereby move said pipe ends to positions where the axes of said pipes generally intersect.

2. The invention as claimed in claim 1 including:

attaching said connecting means to said pipes at points axially spaced a substantial distance away from the terminal ends thereof, to thereby support each of said pipe ends in cantilevered fashion.

3. The invention as claimed in claim 1 and further including the steps of:

providing apparatus for mounting coupling members on said raised pipe ends, and lowering said mounting apparatus from the surface of said body of water to said raised pipe ends between said first and second support frames to mount coupling members thereon as aforesaid.

4. A modular, self-contained portable manipulation frame for enabling a diver to manipulate a pipe located on a sea bottom, comprising:

a pair of spaced legs disposable on opposite sides of said pipe, said legs having massive footing for providing stability to said frame;

a cross-member vetically movably supported between said spaced legs means for connecting said pipe to said crossmember; for support thereby means for moving said cross-member vertically and said connecting means horizontally, to effect vertical and horizontal movement of said pipe end;

said vertical and horizontal moving means including a pressurized hydraulic power source and controls disposable at sea bottom, whereby said diver, by operating said controls, can selectively move said connecting means to manipulate said pipe vertically and horizontally as aforesaid.

5. A frame as defined in claim 4 wherein: said means for effecting vertical movement of said cross-member include a pair of hydraulically actuable piston and cylinder assemblies attached at opposite ends thereof to said cross-member and legs, respectively.

6. A frame as defined in claim 5 wherein: said piston and cylinder assemblies are pivotally attached to said cross-member.

7. A frame as defined in claim 4 wherein:

said footings are elongated in a direction transverse to said cross-member.

8. A frame as defined in claim 4 wherein:

said connecting means includes a strap disposable about said pipe, said strap having opposite ends thereof engageable with said cross-member.

9. In a method of coupling two axially spaced apart misaligned pipes supported on the seabed under a body of water, the combination of steps comprising:

mounting a first support frame adjacent to one of said pipes and supporting said first frame on said seabed;

attaching to said one pipe means for connecting said one pipe to said first support frame at a point axially spaced a substantial distance away from the junction of said pipes, to thereby support said one pipe in cantilevered fashion;

raising said one pipe by applying a lifting force to said connecting means;

mounting a separate second support frame adjacent to the other of said pipes and supporting said second frame on said seabed, said second frame being independent of and axially spaced apart from said first frame;

attaching other means for connecting said other pipe to said second support frame at a point axially spaced a substantial distance away from the junction of said pipes, to thereby support said other pipe in cantilevered fashion;

raising said other pipe by applying a lifting force to said other connecting means;

moving the ends of said pipes laterally and vertically relative to each other while said pipes are supported by said frames, to thereby move said pipe ends into positions where the axes of said pipes generally intersect; providing apparatus for supporting a coupling member which is to be mounted on one of said raised pipe ends;

lowering said supporting apparatus from the surface of said body of water with a coupling member supported thereby to a position adjacent to one of said raised pipe ends and between said first and second support frames;

maneuvering said supporting apparatus to thereby mount said coupling member over said one raised pipe end;

raising said supporting apparatus and thereafter lowering said apparatus again with another coupling member supported thereby;

maneuvering said supporting apparatus to thereby mount said other coupling member over the other one of said raised pipe ends;

and connecting said coupling members together and to said respective pipe ends, to thereby interconnect said pipes.

10. A modular, self-contained portable manipulating frame for enabling a diver to manipulate a pipe located on a seabottom comprising:

a pair of generally vertically extending spaced apart legs disposable on opposite sides of said pipe, said legs having massive footings for providing stability to said frame;

a generally horizontal cross-member pivotally supported between said spaced legs;

means for connecting said pipe to said crosssmember;

hydraulic means for moving said connecting means horizontally, to effect horizontal movement of the end of said pipe;

means for moving said cross-member vertically relative to said footings to effect vertical movement of the end of said pipe, said moving means including a pair of hydraulically actuable generally vertically aligned piston and cylinder assemblies attached at lower and upper thereof to said cross-member and legs, respectively, with said attachments to said cross-member being pivotal about generally horizontal axes to provide said pivotal support;

and a pressurized hydraulic power source and means for controlling said power source, disposable at said seabottom, whereby said diver, by operating said controlling means, can selectively move said connecting means to manipulate said pipe vertically and horizontally as aforesaid.

* * * * *

UNITED STATES PATENT AND TRADEMARK OFFICE
CERTIFICATE OF CORRECTION

PATENT NO. : 4,028,903
DATED : June 14, 1977
INVENTOR(S) : Dave S. Dietrich

It is certified that error appears in the above-identified patent and that said Letters Patent are hereby corrected as shown below:

Column 2, line 9, "botttom" should be --bottom--

Column 4, line 11, delete sentence "Hence cylinder 48 and skid 60 which is supported by the upper surfaces of beams 43."

Column 5, line 59, "cariage" should be --carriage--

Column 6, line 8, delete "air"

Column 8, line 43, "crossmember" should be --cross-member--

Column 10, line 22, "crosssmem-" should be --cross-mem--

Signed and Sealed this twenty-third Day of August 1977

[SEAL]

Attest:

RUTH C. MASON
Attesting Officer

C. MARSHALL DANN
Commissioner of Patents and Trademarks